US012674888B2

(12) United States Patent
Gorman et al.

(10) Patent No.: US 12,674,888 B2
(45) Date of Patent: Jul. 7, 2026

(54) OPTOMECHANICAL ULTRASOUND DETECTOR AND PERFORMING ULTRASOUND IMAGING

(71) Applicant: Government of the United States of America, as represented by the Secretary of Commerce, Gaithersburg, MD (US)

(72) Inventors: Jason John Gorman, Silver Spring, MD (US); Thomas Warren LeBrun, Washington, DC (US); David Alexander Long, Bethesda, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 664 days.

(21) Appl. No.: 17/853,106

(22) Filed: Jun. 29, 2022

(65) Prior Publication Data

US 2022/0413135 A1 Dec. 29, 2022

Related U.S. Application Data

(60) Provisional application No. 63/216,079, filed on Jun. 29, 2021.

(51) Int. Cl.
G01S 15/89 (2006.01)
G01S 7/52 (2006.01)
(52) U.S. Cl.
CPC ...... G01S 15/8968 (2013.01); G01S 7/52023 (2013.01); G01S 7/52079 (2013.01); G01S 15/8915 (2013.01)

(58) Field of Classification Search
None
See application file for complete search history.

(56) References Cited

U.S. PATENT DOCUMENTS

| | | | | | |
|---|---|---|---|---|---|
| 3,745,812 | A | * | 7/1973 | Korpel | G01N 29/0681 |
| | | | | | 310/334 |
| 3,890,829 | A | * | 6/1975 | Korpel | G01N 29/06 |
| | | | | | 367/10 |

(Continued)

FOREIGN PATENT DOCUMENTS

| | | | | |
|---|---|---|---|---|
| JP | 6084672 | B2 | 2/2017 | |
| WO | WO-2018177996 | A1 * | 10/2018 | B42D 25/23 |

OTHER PUBLICATIONS

Hunger, David, et al. "A fiber Fabry-Perot cavity with high finesse." New Journal of Physics 12.6 (2010): 065038. (Year: 2010).*

(Continued)

*Primary Examiner* — Jonathan D Armstrong
(74) *Attorney, Agent, or Firm* — Office of Chief Counsel for National Institute of Standards and Technology

(57) ABSTRACT

An optomechanical ultrasound detector includes: a micromirror substrate; a mechanical resonator that receives ultrasound waves, oscillates at resonator frequency $f_r$, changes cavity length $L_c$, and produces intra-cavity light; and an optical microcavity between the micromirror substrate and the mechanical resonator with cavity length Lc and cavity resonance frequency $f_c$ formed by the mechanical resonator and the micromirror substrate, such that the micromirror substrate produces cavity output light from the intra-cavity light, wherein the cavity output light optically encodes information about the ultrasound waves received by the mechanical resonator.

21 Claims, 8 Drawing Sheets

(56) References Cited

U.S. PATENT DOCUMENTS

| | | | | |
|---|---|---|---|---|
| 4,518,992 | A * | 5/1985 | Kessler | G01S 15/8968 348/678 |
| 4,827,229 | A * | 5/1989 | Sabet-Peyman | G01R 23/17 333/133 |
| 6,901,157 | B2 * | 5/2005 | Ogawa | A61B 5/0097 382/128 |
| 7,349,603 | B2 * | 3/2008 | Souriau | G02B 6/266 257/451 |
| 7,603,016 | B1 * | 10/2009 | Soref | B82Y 20/00 385/129 |
| 9,331,455 | B1 * | 5/2016 | Leisher | H01S 5/141 |
| 9,587,976 | B2 | 3/2017 | Wang et al. | |
| 10,217,045 | B2 * | 2/2019 | Lal | G06V 40/1306 |
| 10,860,916 | B2 * | 12/2020 | Lal | G06N 3/065 |
| 11,378,551 | B2 * | 7/2022 | Thomson | G01N 21/1702 |
| 11,681,897 | B2 * | 6/2023 | Lal | G01N 22/00 327/356 |
| 2002/0094115 | A1 * | 7/2002 | Ogawa | A61B 5/0097 382/128 |
| 2002/0196548 | A1 * | 12/2002 | Kuznetsov | H01S 5/18388 359/578 |
| 2003/0060708 | A1 * | 3/2003 | Ogawa | G01S 15/8968 600/437 |
| 2004/0161201 | A1 * | 8/2004 | Souriau | G02B 6/266 385/52 |
| 2008/0221447 | A1 * | 9/2008 | Igarashi | A61B 1/05 600/437 |
| 2008/0239457 | A1 * | 10/2008 | Scott | G01J 3/26 359/291 |
| 2008/0260380 | A1 * | 10/2008 | Ridley | H04B 10/1125 398/41 |
| 2014/0355381 | A1 * | 12/2014 | Lal | H01J 49/025 327/356 |
| 2018/0164432 | A1 * | 6/2018 | Lal | G01N 22/00 |
| 2018/0174021 | A9 * | 6/2018 | Lal | G06N 3/04 |
| 2019/0083059 | A1 * | 3/2019 | Byrnes | H01S 3/302 |
| 2020/0309603 | A1 * | 10/2020 | Varpula | G01J 5/045 |
| 2021/0117756 | A1 * | 4/2021 | Lal | G01S 15/02 |
| 2022/0365209 | A1 * | 11/2022 | Lam | A61B 5/0095 |
| 2024/0068990 | A1 * | 2/2024 | Chijioke | G01N 29/2418 |

OTHER PUBLICATIONS

Jayich, A. M., et al. "Dispersive optomechanics: a membrane inside a cavity." New Journal of Physics 10.9 (2008): 095008. (Year: 2008).*

Basiri-Esfahani, S., et al., "Precision ultrasound sensing on a chip", Nature Communications, 2019, p. 1-9.

Guggenheim, J.A., et al., "Ultrasensitive plane-concave optical microresonators for ultrasound sensing", Nature Photonics, 2017, p. 714-719, vol. 11.

Fischer, B., "Optical microphone hears ultrasound", Nature Photonics, 2016, p. 1-3, vol. 10.

Westerveld, W.J., et al., "Sensitive, small, broadband and scalable optomechanical ultrasound sensor in silicon photonics", Nature Photonics, 2021, p. 341-345, vol. 15.

Shnaiderman, R., et al., "A submicrometre silicon-on-insulator resonator for ultrasound detection", Nature, 2020, p. 372-386, vol. 585.

Mezil, S., et al., "Single-shot hybrid photoacoustic-fluorescent microendoscopy through a multimode fiber with wavefront shaping", Biomedical Optics Express, 2020, p. 5717-5727, vol. 11 No. 10.

Chow, C.M., et al., "Broadband optical ultrasound sensor with a unique open-cavity structure", Journal of Biomedical Optics, 2011, p. 017001, vol. 16 No. 1.

* cited by examiner

OPTOMECHANICAL ULTRASOUND DETECTOR AND PERFORMING ULTRASOUND IMAGING

CROSS REFERENCE TO RELATED APPLICATIONS

This application claims the benefit of U.S. Provisional Patent Application Ser. No. 63/216,079 (filed Jun. 29, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is an optomechanical ultrasound detector for performing ultrasound imaging, the optomechanical ultrasound detector comprising: a micromirror substrate; a mechanical resonator disposed on the micromirror substrate, in optical communication with the micromirror substrate, spaced apart from the micromirror substrate at a cavity length $L_c$, and that: receives ultrasound waves; oscillates at a resonator frequency $f_r$ in response to receipt of the ultrasound waves; changes the cavity length $L_c$ based on oscillation of the mechanical resonator at resonator frequency $f_r$; receives initial laser light from the micromirror substrate; and produces intra-cavity light from the initial laser light; and an optical microcavity optically interposed between the micromirror substrate and the mechanical resonator and comprising the cavity length $L_c$ with cavity resonance frequency $f_c$ formed by optically opposing surfaces of the mechanical resonator and the micromirror substrate and that: when the intra-cavity light is resonant with the cavity resonance frequency $f_c$, repeatedly communicates the intra-cavity light between the micromirror substrate and the mechanical resonator across the cavity length $L_c$; and when the intra-cavity light is non-resonant with the cavity resonance frequency $f_c$, communicates the intra-cavity light from the mechanical resonator to the micromirror substrate, such that the micromirror substrate produces cavity output light from the intra-cavity light, wherein the cavity output light optically encodes information about the ultrasound waves received by the mechanical resonator.

A process for performing ultrasound imaging with a optomechanical ultrasound detector, the process comprising: receiving ultrasound waves by a mechanical resonator of a optomechanical ultrasound detector, the optomechanical ultrasound detector comprising: a micromirror substrate; a mechanical resonator disposed on the micromirror substrate, in optical communication with the micromirror substrate, spaced apart from the micromirror substrate at a cavity length $L_c$; and an optical microcavity optically interposed between the micromirror substrate and the mechanical resonator and comprising the cavity length $L_c$ with cavity resonance frequency $f_c$ formed by optically opposing surfaces of the mechanical resonator and the micromirror substrate; oscillating the mechanical resonator at a resonator frequency $f_r$ in response to receiving the ultrasound waves; changing the cavity length $L_c$ of the optical microcavity based on oscillation of the mechanical resonator at resonator frequency $f_r$; communicating initial laser light from the micromirror substrate to the mechanical resonator; receiving, by the mechanical resonator, initial laser light from the micromirror substrate; producing, by the mechanical resonator, intra-cavity light from the initial laser light; optically encoding, by the mechanical resonator, in the cavity output light information about the ultrasound waves received by the mechanical resonator; repeatedly communicating the intra-cavity light between the micromirror substrate and the mechanical resonator across the cavity length $L_c$ when the intra-cavity light is resonant with the cavity resonance frequency $f_c$; and communicating the intra-cavity light from the mechanical resonator to the micromirror substrate; and producing, by the micromirror substrate, cavity output light from the intra-cavity light to perform ultrasound imaging.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
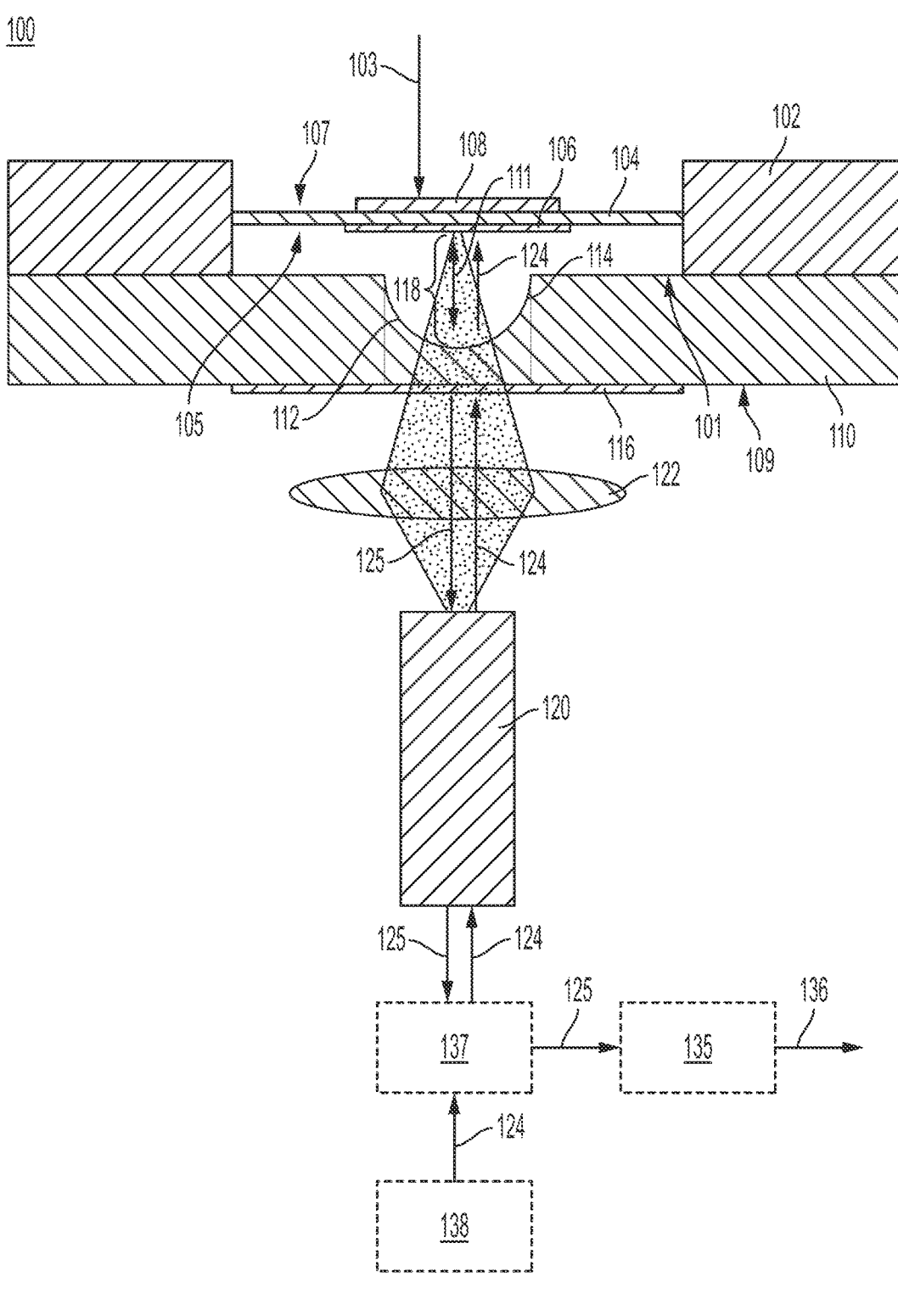
FIG. 1 shows an optomechanical ultrasound detector, according to some embodiments.

A detailed description of one or more embodiments is presented herein by way of exemplification and not limitation.

Conventional ultrasound transducers for medical imaging and structural diagnostics have limited resolution due to stiffness and low sensitivity of piezoelectric elements in such conventional ultrasound transducers. As a result, detecting small changes in material properties and imaging through highly reflective materials has been challenging, if not impossible, with conventional technology. Accordingly, certain conventional technologies have limited use for ultrasound imaging. The optomechanical ultrasound detector 100 described herein overcome these limitations.

It has been discovered that a optomechanical ultrasound detector 100 described herein ultra-sensitively and optomechanically detects ultrasound waves for ultrasound imaging. Advantageously, the sensitivity of optomechanical ultrasound detector 100 can be at least two orders of magnitude better than conventional technology and sufficient for novel medical imaging modalities, including ultrasound whole brain imaging. Optomechanical ultrasound detector 100 can include a Fabry-Perot optical cavity with a mechanical resonator so that when the mechanical resonator moves under the influence of ultrasound, ultra-sensitive readout of the motion is achieved using the optical cavity and laser light. In addition to sensitivity, the optomechanical ultrasound detector 100 provides greater safety during imaging than conventional devices due to lower ultrasound power that can be used while yielding higher resolution imaging. Performing ultrasound imaging with optomechanical ultrasound detector 100 can be applied for acoustic detection as well as photoacoustic measurements.

Optomechanical ultrasound detector 100 performs ultrasound imaging. In an embodiment, with reference to FIG. 1, FIG. 2, FIG. 3, FIG. 4, FIG. 5, FIG. 6, FIG. 7, and FIG. 8, optomechanical ultrasound detector includes: a micromirror substrate 110; a mechanical resonator 104 disposed on the micromirror substrate 110, in optical communication with the micromirror substrate 110, spaced apart from the micromirror substrate 110 at a cavity length Lc, and that: receives ultrasound waves 103; oscillates at a resonator frequency fr in response to receipt of the ultrasound waves 103; changes the cavity length Lc based on oscillation of the mechanical resonator 104 at resonator frequency fr; receives initial laser light 124 from the micromirror substrate 110; and produces intra-cavity light 111 from the initial laser light 124; and an optical microcavity 118 optically interposed between the micromirror substrate 110 and the mechanical resonator 104 and including the cavity length Lc with cavity resonance frequency fc formed by optically opposing surfaces of the mechanical resonator 104 and the micromirror substrate 110 and that: when the intra-cavity light 111 is resonant with the cavity resonance frequency fc, repeatedly communicates the intra-cavity light 111 between the micromirror substrate 110 and the mechanical resonator 104 across the cavity length Lc; and when the intra-cavity light 111 is non-resonant with the cavity resonance frequency fc, communicates the intra-cavity light 111 from the mechanical resonator 104 to the micromirror substrate 110, such that the micromirror substrate 110 produces cavity output light 125 from the intra-cavity light 111, wherein the cavity output light 125 optically encodes information about the ultrasound waves 103 received by the mechanical resonator 104.

In an embodiment, optomechanical ultrasound detector 100 includes resonator substrate 102 disposed on the micromirror substrate 110 and on which the mechanical resonator 104 is disposed.

In an embodiment, optomechanical ultrasound detector 100 includes anti-reflective member 108 disposed on an ultrasound surface 107 of the mechanical resonator 104 and that receives the ultrasound waves 103.

In an embodiment, optomechanical ultrasound detector 100 includes resonator optical reflector 106 disposed on a reflector surface 105 of the mechanical resonator 104 and that receives the initial laser light 124 from the micromirror substrate 110 and reflects the initial laser light 124 as the intra-cavity light 111.

In an embodiment, optomechanical ultrasound detector 100 includes mirror anti-reflective member 116 disposed on an optical coupling surface 109 of the micromirror substrate 110 and that receives the initial laser light 124, communicates the initial laser light 124 to the mechanical resonator 104 via the optical microcavity 118, receives the intra-cavity light 111 from the optical microcavity 118, and produces the cavity output light 125 from the intra-cavity light 111.

In an embodiment, optomechanical ultrasound detector 100 includes concave micromirror 112 disposed on an optical coupling surface 109 of the micromirror substrate 110, such that the concave micromirror 112 is arranged to be optically concave with respect to the optical microcavity 118.

In an embodiment, optomechanical ultrasound detector 100 includes mirror reflective member 114 disposed on a cavity surface 101 of the micromirror substrate 110 and that receives the initial laser light 124 from the micromirror substrate 110 and is an intra-cavity mirror for the optical microcavity 118, such that the mirror reflective member 114: reflects the intra-cavity light 111 when the intra-cavity light 111 is resonant with the cavity resonance frequency fc; and communicates the intra-cavity light 111 to the micromirror substrate 110 when the intra-cavity light 111 is non-resonant with the cavity resonance frequency fc.

In an embodiment, optomechanical ultrasound detector 100 includes optical fiber 120 in optical communication with the micromirror substrate 110 and that communicates the initial laser light 124 to the micromirror substrate 110 and receives the cavity output light 125 from the micromirror substrate 110. In an embodiment, optomechanical ultrasound detector 100 includes coupling lens 122 in optical communication with the micromirror substrate 110 and that receives the initial laser light 124, communicates the initial laser light 124 to the micromirror substrate 110, and receives the cavity output light 125 from the micromirror substrate 110, wherein the micromirror substrate 110 is interposed between coupling lens 122 and the optical microcavity 118. The coupling lens 122 can be disposed on the micromirror substrate 110. In an embodiment, mirror anti-reflective member 116 is disposed on the coupling lens 122, wherein the coupling lens 122 is interposed between the mirror anti-reflective member 116 and the micromirror substrate 110.

In an embodiment, optomechanical ultrasound detector 100 includes nanophotonic waveguide 144 in optical communication with the micromirror substrate 110 and that receives the initial laser light 124, communicates the initial laser light 124 to the micromirror substrate 110, and receives the cavity output light 125 from the micromirror substrate 110. The micromirror substrate 110 can be interposed between nanophotonic waveguide 144 and the optical microcavity 118. In an embodiment, nanophotonic waveguide 144 includes nanophotonic coupling member 146 in optical communication with the micromirror substrate 110 and that receives the initial laser light 124, communicates the initial laser light 124 to the micromirror substrate 110, and receives the cavity output light 125 from the micromirror substrate 110. The micromirror substrate 110 can be interposed between nanophotonic coupling member 146 and the optical microcavity 118. In an embodiment, optomechanical ultrasound detector 100 includes nanophotonic substrate 142 on which the nanophotonic waveguide 144 is disposed. In an embodiment, optomechanical ultrasound detector 100 includes a dielectric layer 140 disposed on the nanophotonic substrate 142 such that the dielectric layer 140 is interposed between the nanophotonic substrate 142 and the nanophotonic waveguide 144.

In an embodiment, optomechanical ultrasound detector 100 includes meta-optic 127 disposed on the micromirror substrate 110 in optical communication with the micromirror substrate 110 and that receives the initial laser light 124, communicates the initial laser light 124 to the micromirror substrate 110, and receives the cavity output light 125 from the micromirror substrate 110. The micromirror substrate 110 can be interposed between the meta-optic 127 and the optical microcavity 118.

When ultrasound waves 103 impinge mechanical resonator 104, mechanical resonator 104 displaces periodically due to the pressure wave generated by ultrasound waves 103. The optical microcavity 118 transduces motion of ultrasound waves 103. Various optical readout configurations and processes can be included to determine how cavity length $L_c$ of optical microcavity 118 changes as a function of time and to determining the motion of mechanical resonator 104. The motion of mechanical resonator 104 detects presence of ultrasound waves 103, e.g., as ultrasound reflections during imaging. Such reflections are used to construct images of a sample under inspection. Due to a high displacement sensitivity provided by this optical microcavity readout, the optomechanical ultrasound detector 100 has higher sensitivity to ultrasound waves 103 than conventional detectors.

Figure 2:
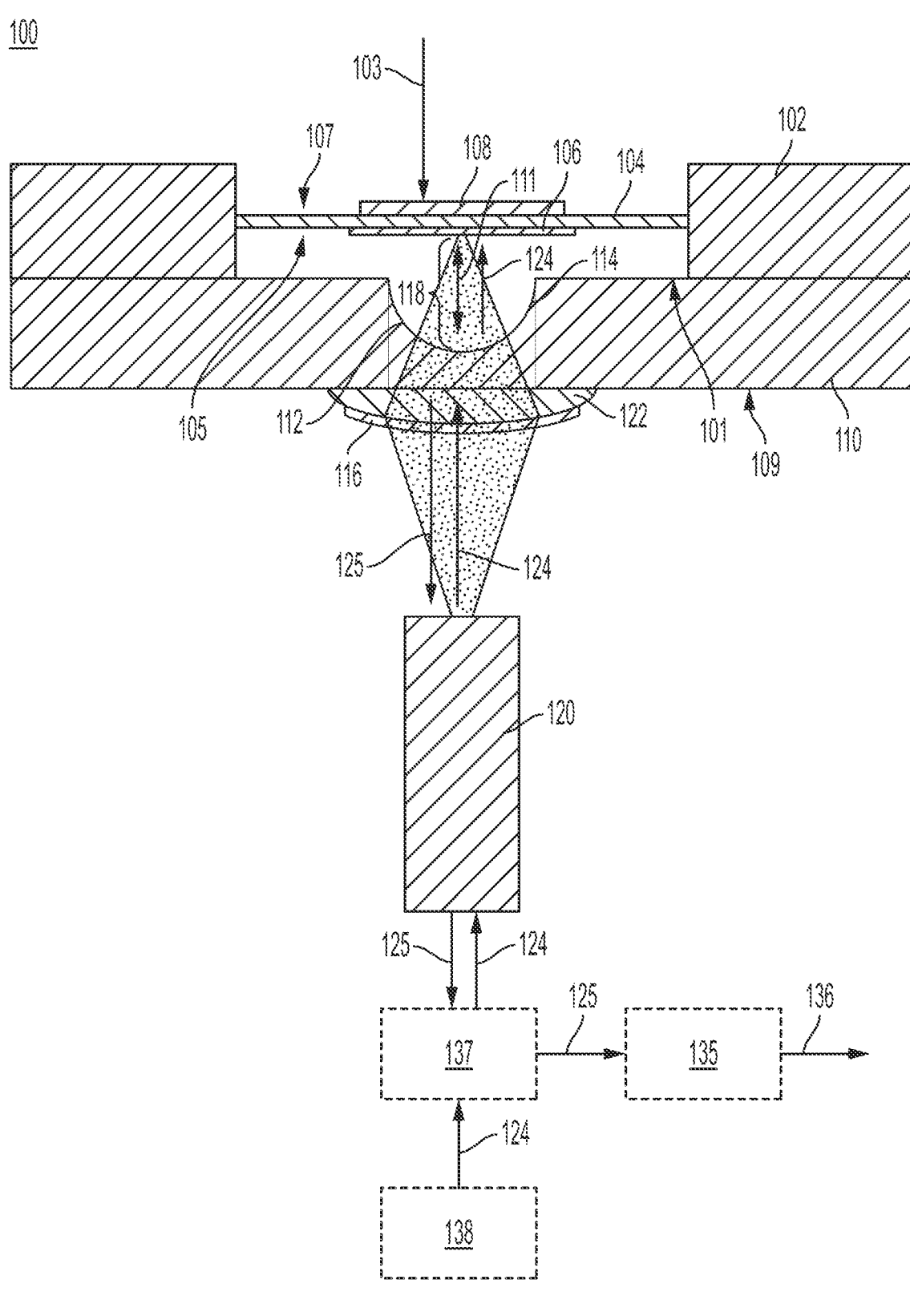
FIG. 2 shows an optomechanical ultrasound detector, according to some embodiments.
Figure 3:
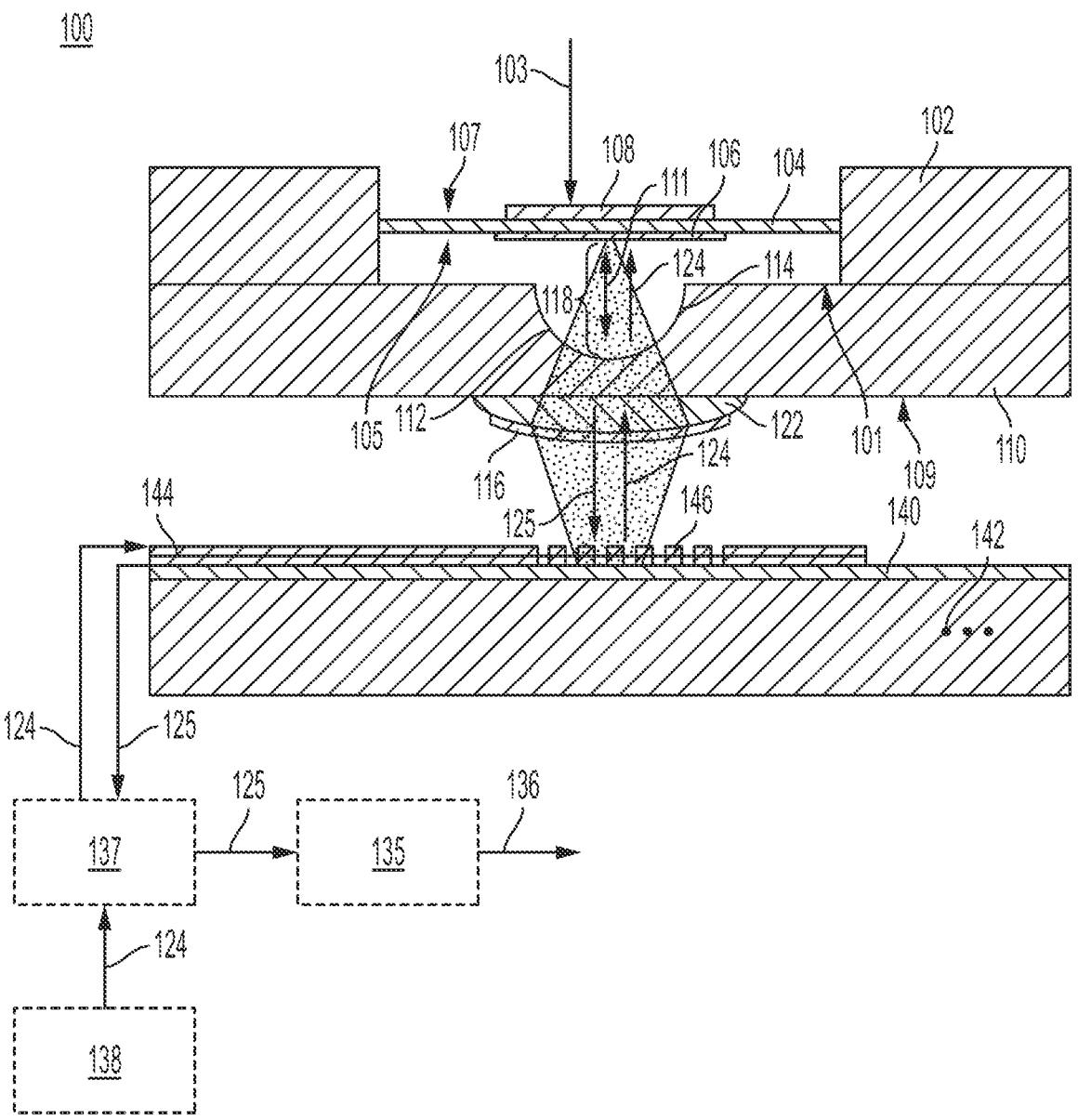
FIG. 3 shows an optomechanical ultrasound detector, according to some embodiments.

The optomechanical ultrasound detector 100 includes optical fiber 120 and coupling lens 122 to send initial laser light 124 into optical microcavity 118 and to collect cavity output light 125 reflected from mechanical resonator 104 and output from optical microcavity 118. The initial laser light 124 can be communicated into optical microcavity 118 in various ways and configurations, such as with integrated lens 122, e.g., as shown in FIG. 2. The optomechanical ultrasound detector 100 can include communication of initial laser light 124 via nanophotonic structures such as nanophotonic waveguide 144. The optomechanical ultrasound detector 100 with integrated lens 122 can include optical fiber 120, and initial laser light 124 can be coupled into optical microcavity 118 by coupling lens 122 disposed on micromirror substrate 110, which can provide a reduction in size of optomechanical ultrasound detector 100. The optomechanical ultrasound detector 100 with nanophotonic light delivery 144 further can reduce the size of optomechanical ultrasound detector 100 by replacing the optical fiber 120 with a nanophotonic substrate 142 and nanophotonic coupling member 146. The nanophotonic substrate 142 couples light from a nanophotonic waveguide 144, through a nanophotonic coupling member 146, passing initial laser light 124 through integrated lens 122, and into optical microcavity 118 so that optomechanical ultrasound detector 100 can be formed by stacked substrates that can be aligned and bonded in an absence of laborious manual assembly.

It is contemplated that optomechanical ultrasound detector 100 can be a single detector or arranged into one-dimensional, two-dimensional, and the like arrays for wide-field ultrasound imaging.

Optomechanical ultrasound detector 100 can be made of various elements and components that are assembled, formed, or fabricated in a number of ways, e.g., microfabrication, wherein mechanical resonator 104 is a mechanical resonator that is suspended by resonator substrate 102 proximate to micromirror substrate 110. In this manner, resonator substrate 102 supports mechanical resonator 104, which results in a cavity length $L_c$ providing a separation between resonance modes of optical microcavity 118. On a separate microfabricated chip, concave micromirror 112 can be formed in micromirror substrate 110. When the chips containing mechanical resonator 104 and concave micromirror 112 are assembled together, they form optical microcavity 118, wherein opposing surfaces of mechanical resonator 104 and concave micromirror 112 have high reflectivity coatings disposed thereon respectively as resonator optical reflector 106 and mirror reflective member 114. Motion of the mechanical resonator 104 is measured by using analyzer 135 to detect changes in optical resonances of optical microcavity 118 through communication of intra-cavity light 111 and cavity output light 125 produced from ultrasound waves 103 that cause oscillation of mechanical resonator 104 relative to micromirror substrate 110. That is, ultrasound waves 103 are transduced into intra-cavity light 111 by mechanical resonator 104 that is coupled into optical microcavity 118 as intra-cavity light 111 and repeatedly reflected between mechanical resonator 104 and micromirror substrate 110 at cavity resonance frequency $f_c$ before being communicated out of optical microcavity 118 as cavity output light 125, wherein cavity output light 125 is received by analyzer 135. Micromirror substrate 110 provides a stable cavity design that can be, e.g., a hemispherical cavity, and high reflectivity coatings are included to provide high optical finesse that results in high displacement sensitivity of mechanical resonator 104 relative to concave micromirror 112. Coatings and materials used for mechanical resonator 104 and concave micromirror 112 can be selected for operation with laser wavelengths for micromirror substrate 110 and mirror reflective member 114 that can include visible light from 400 nm to 700 nm, near infrared light from 700 nm to 1000 nm, or short-wave infrared from 1000 nm to 3000 nm. Operation with a laser wavelength near 1550 nm can provide integration with a large number of fiber optic components designed for telecommunications, making optomechanical ultrasound detector 100 scalable and compatible with off-the-shelf optical characterization tools.

Elements of optomechanical ultrasound detector 100 can be various sizes. It is contemplated that materials for micromirror substrate 110 and other optical elements can be selected based on a resonance frequency desired for optical microcavity 118. The cavity length L of optical microcavity 118, e.g., can be from 1 micrometer ($\mu$m) to 50 millimeters (mm), specifically from 10 micrometer ($\mu$m) to 5 millimeters (mm), and more specifically from 100 $\mu$m to 10 mm, although other suitable cavity lengths can be included.

Elements of micromirror substrate 110 can be made of a material that is physically or chemically resilient in an environment in which micromirror substrate 110 is disposed. Exemplary materials include a metal, ceramic, thermoplastic, glass, semiconductor, and the like. The elements of micromirror substrate 110 can be made of the same or different material and can be monolithic in a single physical body or can be separate members that are phsycially joined. Transmission of a selected wavelength of light, e.g., for micromirror substrate 110, can be provided by the material used for such optical elements. For example, tranmission of visible light by micromirror substrate 110 or concave micromirror 112 can be provided by fused silica.

In an embodiment, mechanical resonator 104 is a continuous mechanical structure connected to resonator substrate 102 on all sides and with a resonator frequency $f_r$, e.g., from 0.5 MHz to 100 MHz to coincide with the frequencies used in ultrasound imaging, or another frequency that can be selected for a chosen application. The shape of the mechanical resonator 104 in the plane of resonator substrate 102 can be arbitrary, wherein exemplary shapes include circular or polygonal (e.g., square, hexagonal, and the like). A planar dimension can be, e.g., from 50 $\mu$m to 2 mm. The resonator optical reflector 106 and anti-reflective member 108 can include a Bragg grating that can include, e.g., layered dielectric materials, a two-dimensional photonic crystal that can be disposed on or into mechanical resonator 104. The resonator optical reflector 106 can have reflectivity from 20% to 99.999% that can depend on its design and fabrication. The anti-reflective member 108 can have a stiffness perpendicular to resonator substrate 102 due to bending stiffness or tension in the material. While not being limited to such, exemplary materials for mechanical resonator 104 include silicon, silicon nitride, silicon dioxide, silicon carbide, fused silica, and the like.

The concave micromirror 112 can be semispherical in an area where initial laser light 124 or cavity output light 125 propagate through the mirror, The mirror reflective member 114 and mirror anti-reflective member 116 on concave micromirror 112 independently can be a Bragg grating that includes, e.g., layered dielectric materials. The mirror reflective member 114 can have a reflectivity from 20% to 99.999%, e.g., based on its design and fabrication. While not limited thereto, exemplary materials for concave micromirror 112 include silicon, silicon nitride, silicon dioxide, silicon carbide, fused silica, and the like. The radius of concave micromirror 112 and the distance between concave micromirror 112 and mechanical resonator 104 is selected so that optical microcavity 118 is an optically stable microcavity.

Laser light 124 can have a wavelength ranging from 400 nm to 1700 nm depending on the materials selected for the detector, e.g., analyzer 135. A light source 138 can produce the initial laser light 124 at a fixed or tunable frequency. An optical splitter 137 can communicate initial laser light 124 from light source 138 to micromirror substrate 110 and communicate cavity output light 125 from micromirror substrate 110 to analyzer 135. The optical splitter 137 can include suitable optical and electrical components for this operation such as a mirror, beam splitter, motor, mixer, and the like.

Figure 4:
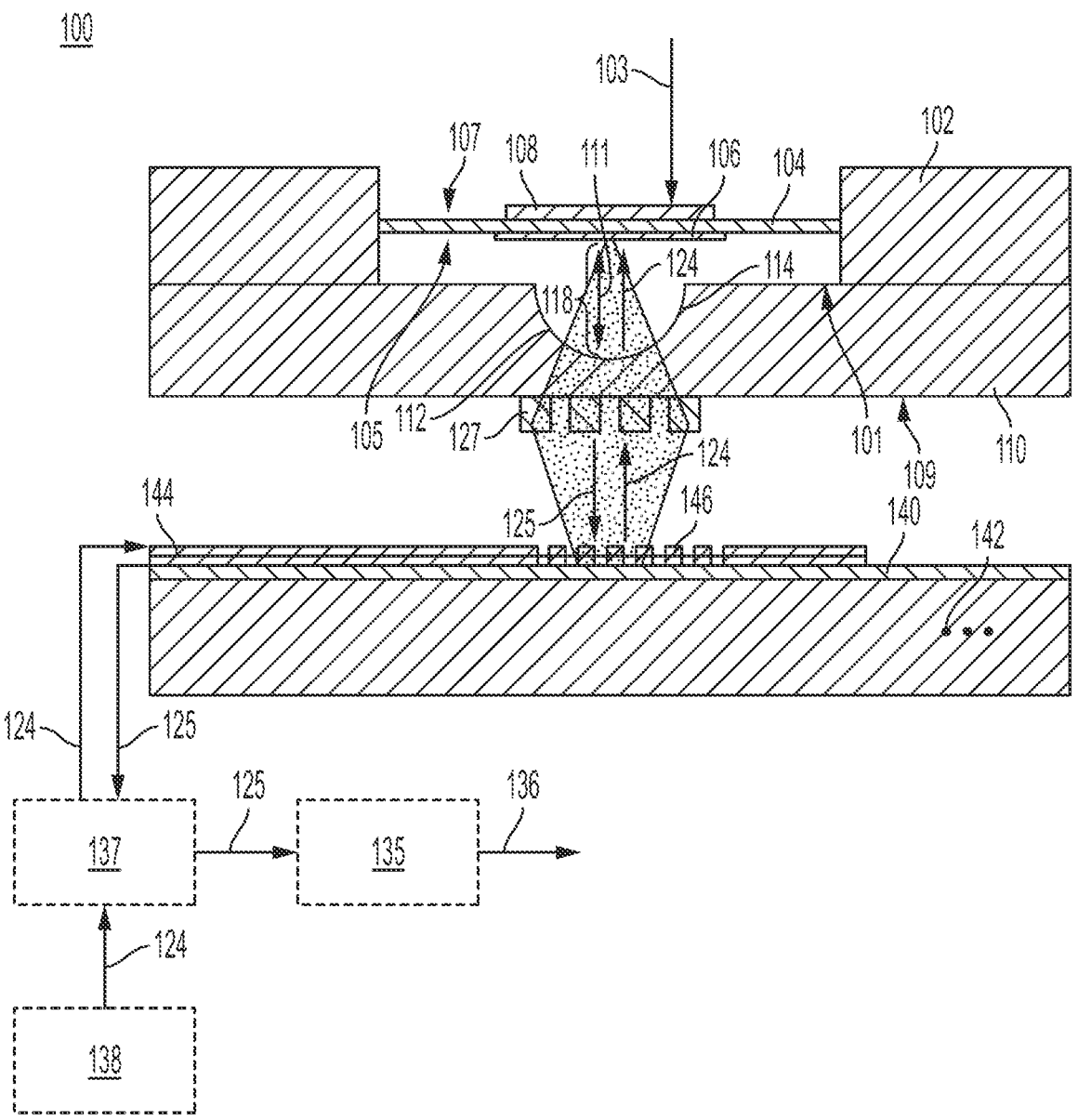
FIG. 4 shows an optomechanical ultrasound detector, according to some embodiments.

The coupling lens 122 has a focal length that provides efficient mode coupling of initial laser light 124 into optical microcavity 118 and can be made from and include various materials. Exemplary materials for coupling lens 122 include including silicon, silicon nitride, silicon dioxide, silicon carbide, fused silica, titanium oxide, aluminum oxide, polymer, and the like. The coupling lens 122 can be interposed between micromirror substrate 110 and light source 138 either spaced apart from micromirror substrate 110 or disposed on micromirror substrate 110. The coupling lens 122 can have various geometrical shapes and formats such as plano-concave for disposal on micromirror substrate 110 or a meta-optic 127 such as a flat meta-lens, as shown in FIG. 4. The meta-optic 127 can include, e.g., a periodic nanostructure, nanofabricated Fresnel lens, and the like.

Nanophotonic substrate 142 can be included in optomechanical ultrasound detector 100. In some embodiments, nanophotonic substrate 142 is include instead of optical fiber 120 or coupling lens 122. Nanophotonic waveguide 144 receives initial laser light 124 disposed on nanophotonic substrate 142. The nanophotonic waveguide 144 confines laser light (124, 125) with low optical attenuation. Dielectric layer 140 constrains light to propagate in nanophotonic waveguide 144 without communication into nanophotonic substrate 142. The nanophotonic waveguide 144 communicates initial laser light 124 to nanophotonic coupling member 146 and receives cavity output light 125 from nanophotonic coupling member 146. The nanophotonic coupling member 146 can include a periodic nanostructure that communicates laser light (124, 125) perpendicular to nanophotonic substrate 142 with a selected numerical aperture and beam width. Non-limiting examples of materials for elements disposed on nanophotonic substrate 142 include silicon, silicon nitride, silicon dioxide, silicon carbide, fused silica, titanium oxide, aluminum oxide, polymer, and the like. When flat meta-lens 127 is disposed on micromirror substrate 110 and includes the periodic nanostructure or nanofabricated Fresnel lens, resonator substrate 102, micromirror substrate 110, and nanophotonic substrate 142 can be bonded together to form a monolithic and compact detector of ultrasound waves 103.

Figure 5:
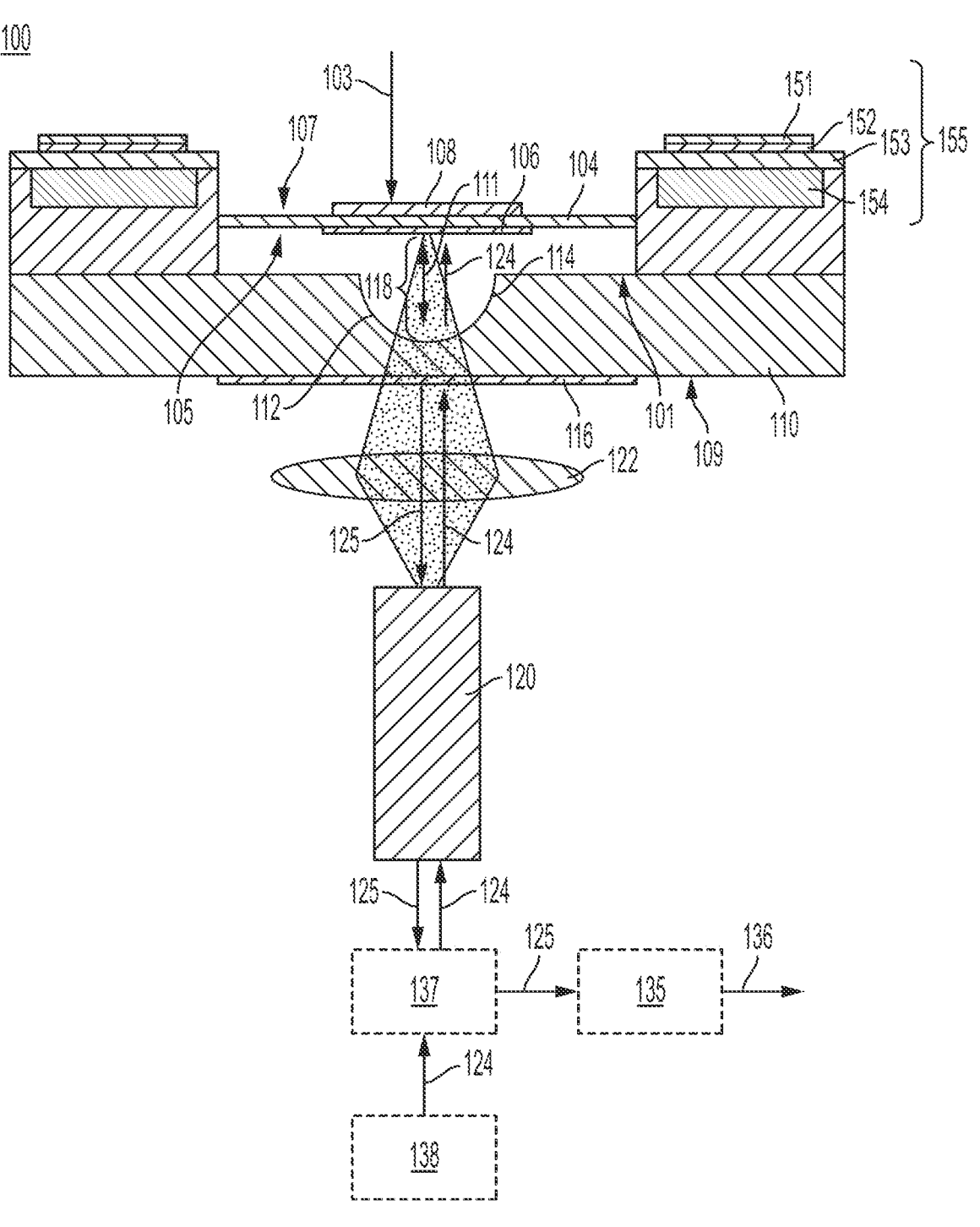
FIG. 5 shows an optomechanical ultrasound detector, according to some embodiments.
Figure 6:
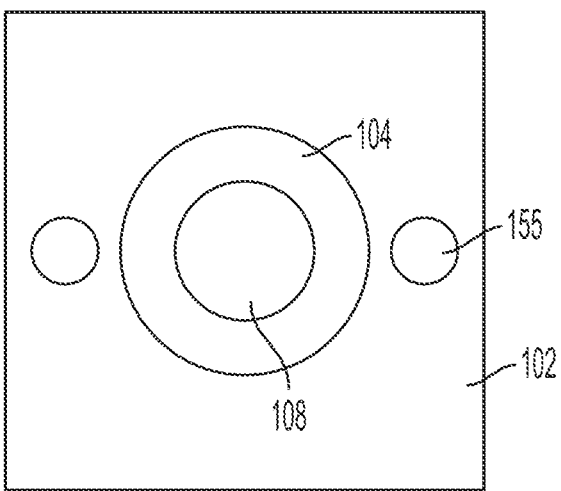
FIG. 6 shows plan views for a resonator substrate, micromirror substrate, and nanophotonic waveguide on a dielectric layer, according to some embodiments.
Figure 6:
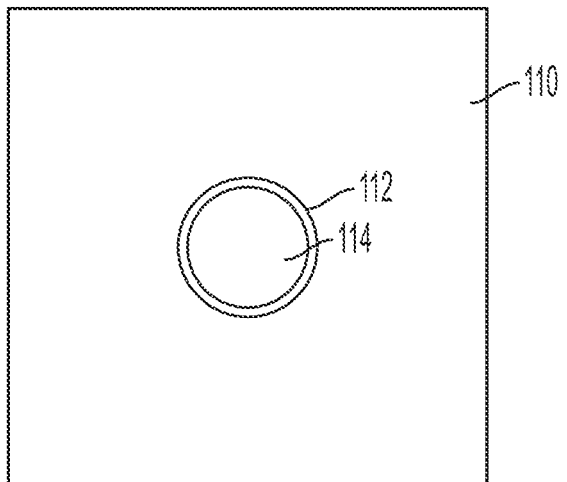
Figure 6:
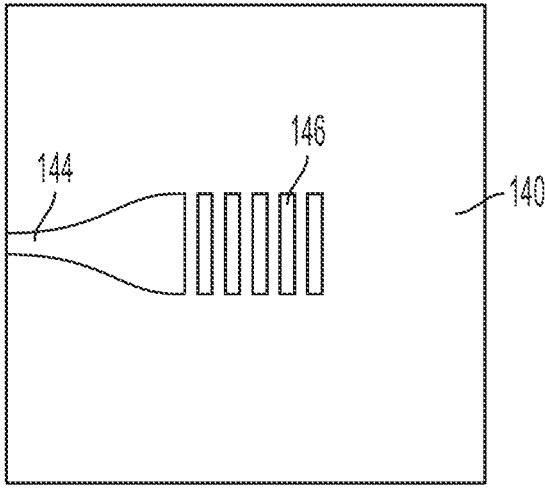

In an embodiment, with reference to FIG. 5, optomechanical ultrasound detector 100 includes an integrated piezoelectric ultrasound source 155. The integrated piezoelectric ultrasound source 155 can include metal layer 151, piezoelectric material 152, vibrating membrane 153, and optional air cavity 154. When an electrical pulse is applied to metal layer 151, piezoelectric material 152 expands and deforms vibrating membrane 153. An electrical pulse with a selected frequency and power produces an ultrasound wave that propagates from optomechanical ultrasound detector 100 until incident at an object external to optomechanical ultrasound detector 100. Some energy of this ultrasound wave reflects from the object and is detected by optomechanical ultrasound detector 100.

It should be appreciated that optomechanical ultrasound detector 100 includes optical microcavity 118 that is an optical cavity that can include a hemispherical micromirror formed in a micromirror substrate 110 that can be bonded to resonator substrate 102 having disposed thereon mechanical resonator 104 with resonator optical reflector 106 that can be a flat mirror. Beneficially, optomechanical ultrasound detector 100 can fill a volume less than a cubic millimeter. Ultrasound waves 103 incident on mechanical resonator 104 cause oscillation of mechanical resonator 104, which shifts the cavity resonance frequency $f_c$ of optical microcavity 118. The cavity resonance frequency $f_c$ can be measured continuously to detect the oscillation of mechanical resonator 104 and amplitude and phase of ultrasound waves 103.

The concave micromirror and mechanical resonator chips can be microfabricated in substrates that can include silicon, glass, or other dielectrics or semiconductors, The concave micromirror and mechanical resonator independently can have high reflectivity surfaces for high finesse or low optical loss in optical microcavity 118. This increases the sensitivity of optomechanical ultrasound detector 100. The high reflectivity surfaces could be dielectric Bragg mirror coatings, photonic crystals, or optical meta-surfaces. The backside of the concave mirror chip can have an antireflection coating to minimize parasitic cavities between the various surfaces in the bonded chip stack.

The mechanical resonator 104 can be a plate (e.g., material having bending stiffness) or a membrane (e,g., a material under tension with minimal bending stiffness). The planar geometry of the plate or membrane can be arbitrary, e.g., circular or square. The thickness and planar dimensions of the mechanical resonator 104 can be selected for a selected resonance frequency or compliance based on an application. Medical ultrasound imaging can occur from 1 MHz to 20 MHz, and imaging resolution limit set by the ultrasound frequency and acoustic velocity of the human body can be from 0.1 mm and 1 mm. The mechanical resonator 104 provides imaging in view of these characteristics. When operating at 20 MHz with a circular resonator, the diameter of mechanical resonator 104 can be, e.g., 0.1 mm.

Light (e.g., 124, 125) is coupled into and out of the optical cavity 118 with optical fiber 120 and lens 122. The optical cavity 118 sensitively optically transduces displacement of the mechanical resonator 104. Transduction of the displacement with analyzer 135 and a laser 137 can include sideband laser locking, Pound-Drever-Hall laser locking, and the like.

Optomechanical ultrasound detector 100 can be made in various ways. It should be appreciated that optomechanical ultrasound detector 100 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, optomechanical ultrasound detector 100 can be disposed in a terrestrial environment or space environment. Elements of optomechanical ultrasound detector 100 can be formed from silicon, silicon nitride, and the like although other suitable materials, such ceramic, glass, or metal can be used. According to an embodiment, the elements of optomechanical ultrasound detector 100 are formed using microfabrication processing techniques. It should be appreciated that optomechanical ultrasound detector 100 can be made by additive or subtractive manufacturing. In an embodiment, elements of optomechanical ultrasound detector 100 are selectively etched to remove various different materials using different etchants and photolithographic masks and procedures. The various layers thus formed can be subjected to joining by bonding to form optomechanical ultrasound detector 100.

According to an embodiment, a process for making mechanical resonator 104 includes: providing a base material, e.g., a silicon-on-insulator wafer, wherein the wafer can include various layers, e.g., a stack of materials such as a silicon handle wafer (e.g., thickness from 300 μm to 900 μm), a silicon dioxide layer (e.g., thickness from 500 nm to 2 μm), and a silicon device layer (e.g., thickness from 200 nm to 50 μm), such that the base member is subjected to modification for forming mechanical resonator 104; subjecting device layer of the base material to photolithography and to deep reactive ion etching to etch down to the silicon dioxide layer and forming independent mechanical resonators; subjecting the handle wafer to photolithography and deep reactive ion etching to etch down to the silicon oxide layer and forming a planar shape of mechanical resonator 104; separating the mechanical resonators into individual chips, wherein separating can involve using a dicing saw; and forming resonator optical reflector 106, mirror anti-reflective member 116, other reflective elements, or other anti-reflective elements with shadow masking and ion beam sputtering for Bragg grating tantalum-pentoxide/silicon dioxide coatings.

According to an embodiment, a process for making concave micromirror 112 includes: providing a silicon wafer with thickness ranging from 300 μm to 900 μm; using photolithography and deep reactive ion etching to etch a trench in the top surface of the silicon wafer to form a trench that is square and between 0.5 mm and 5 mm wide; after cleaning the wafer, depositing silicon nitride on both sides of the wafer using chemical vapor deposition with a thickness between 200 nm and 1000 nm; using photolithography and reactive ion etching to etch a circular aperture through the silicon nitride layer located at the center of the square trench; using hydrofluoric acid, nitric acid, and acetic acid at room temperature to etch the silicon exposed by the circular aperture, resulting in a semispherical concave micromirror; using heated phosphoric acid to remove the silicon nitride layer and then clean the wafer; using a dicing saw to separate the concave micromirrors into chips; and using shadow masking with ion beam sputtering for Bragg grating tantalum-pentoxide/silicon dioxide coatings to apply the reflective element and anti-reflective element.

According to an embodiment, a process for making optomechanical ultrasound detector 100 includes: bonding a silicon chip including a concave micromirror to a chip containing a mechanical resonator using silicon fusion bonding; aligning the bonded chip stack to an optical fiber and coupling lens that are located in a metal package with a flat surface for holding the chip stack; and using a low-stress adhesive to bond the chip stack to the metal package to make optomechanical ultrasound detector 100.

Optomechanical ultrasound detector has numerous advantageous and unexpected benefits and uses. In an embodiment, a process for performing ultrasound imaging with optomechanical ultrasound detector 100 includes: receiving ultrasound waves 103 by a mechanical resonator 104 of a optomechanical ultrasound detector 100, oscillating the mechanical resonator 104 at a resonator frequency fr in response to receiving the ultrasound waves 103; changing the cavity length Lc of the optical microcavity 118 based on oscillation of the mechanical resonator 104 at resonator frequency fr; communicating initial laser light 124 from the micromirror substrate 110 to the mechanical resonator 104; receiving, by the mechanical resonator 104, initial laser light 124 from the micromirror substrate 110; producing, by the mechanical resonator 104, intra-cavity light 111 from the initial laser light 124; optically encoding, by the mechanical resonator 104, in the cavity output light 125 information about the ultrasound waves 103 received by the mechanical resonator 104; repeatedly communicating the intra-cavity light 111 between the micromirror substrate 110 and the mechanical resonator 104 across the cavity length Lc when the intra-cavity light 111 is resonant with the cavity resonance frequency fc; communicating the intra-cavity light 111 from the mechanical resonator 104 to the micromirror substrate 110; and producing, by the micromirror substrate 110, cavity output light 125 from the intra-cavity light 111 to perform ultrasound imaging.

In an embodiment, the process for performing ultrasound imaging includes communicating the cavity output light 125 from the micromirror substrate 110 to an analyzer 135.

In an embodiment, the process for performing ultrasound imaging includes, performing by the analyzer 135: receiving the cavity output light 125; analyzing the cavity output light 125; and determining the information about the ultrasound waves 103 from analyzing the cavity output light 125.

Figure 7:
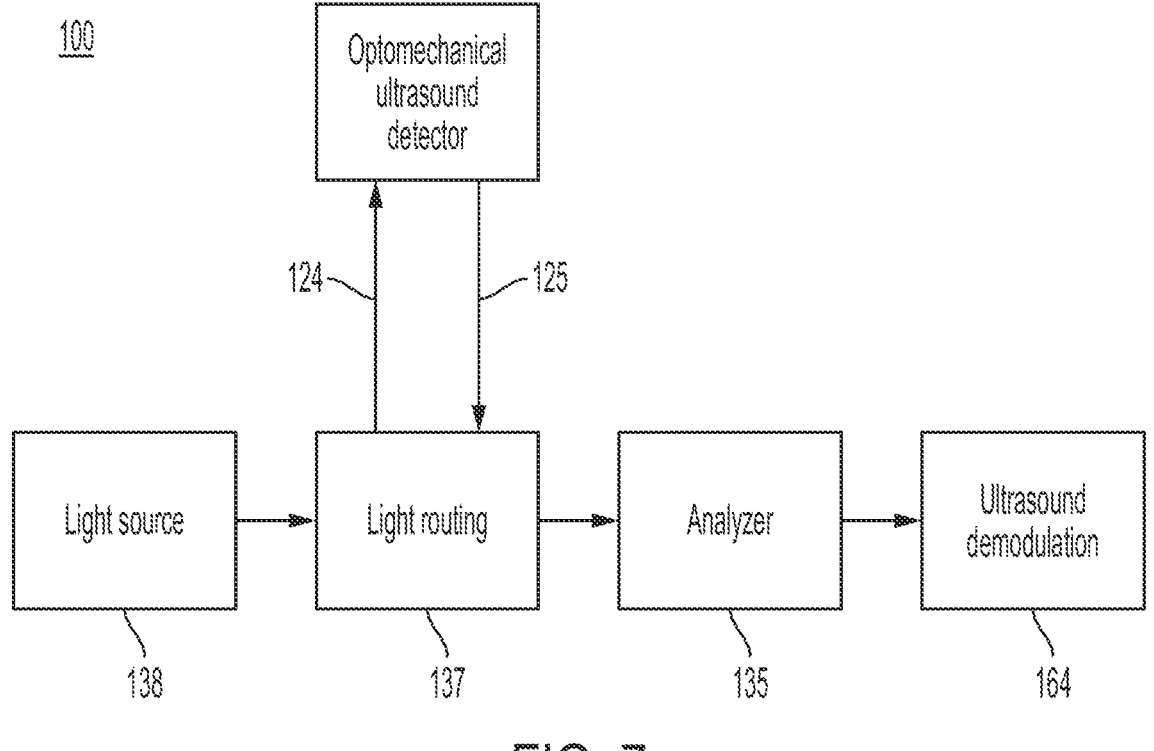
FIG. 7 shows an optomechanical ultrasound detector, according to some embodiments.
Figure 8:
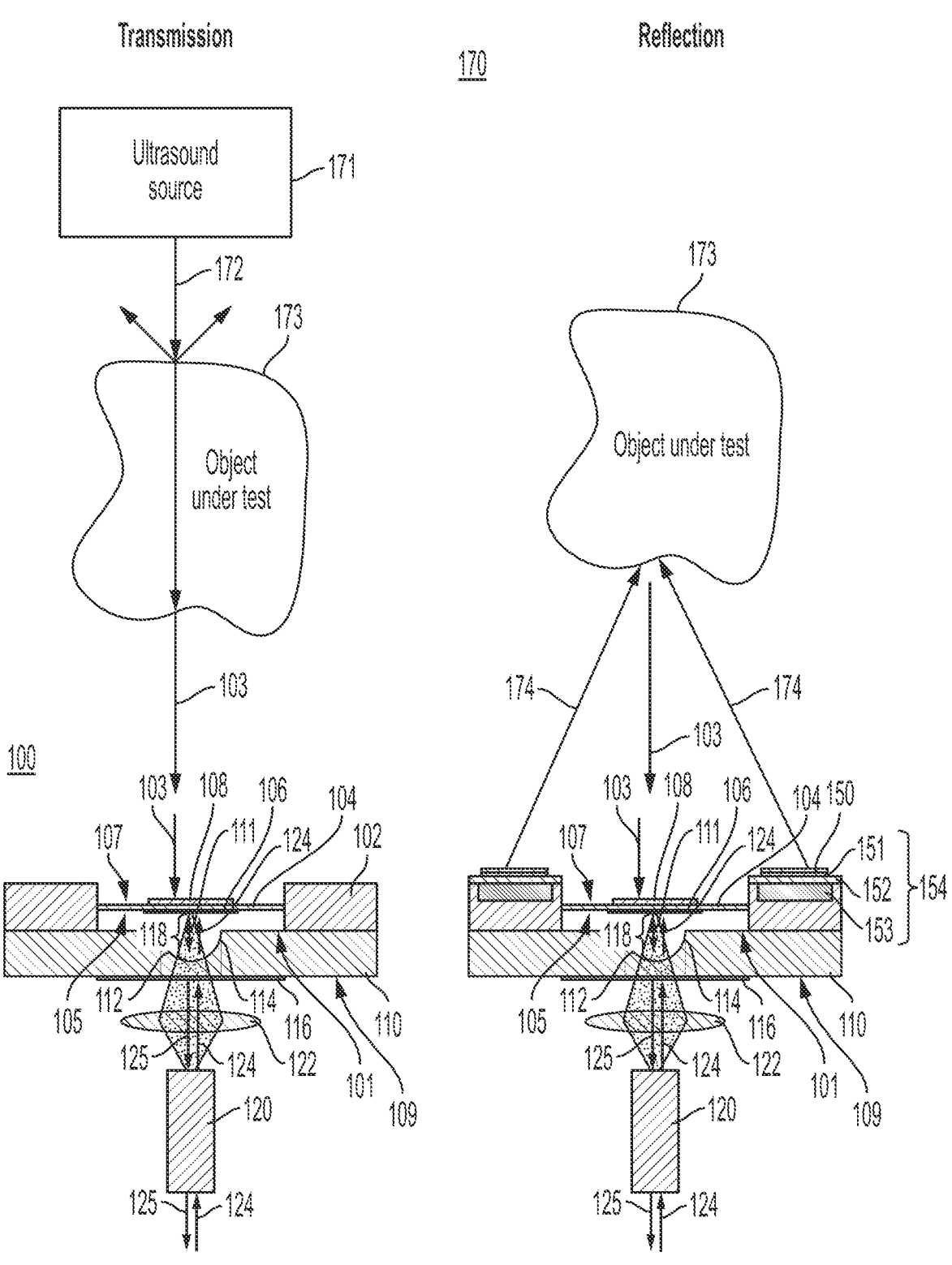
FIG. 8 shows an optomechanical ultrasound detector for transmission mode ultrasound detection and reflection mode ultrasound detection, according to some embodiments.

In an embodiment, a process for performing ultrasound imaging includes receiving initial laser light 124 by optomechanical ultrasound detector 100, wherein the wavelength of laser light 124 is set so that part of initial laser light 124 is received in optical microcavity 118, and multiple wavelengths can be used simultaneously. The initial laser light 124 entering optical microcavity 118 circulates intra-cavity light 111 and initial laser light 124 in optical microcavity 118, reflecting from mirror reflector member (106, 114). Laser light is continuously coupled into and re-emitted by the cavity 118. As the mechanical resonator 104 oscillates in response to receipt of ultrasound waves 103, mechanical resonator 104 changes cavity length L_c and the intensity or frequency in a spectrum of intra-cavity light 111 and initial laser light 124 in optical microcavity 118. Some of intra-cavity light 111 exits optical microcavity 118 as cavity output light 125 through the concave micromirror 112 and propagates toward the light routing element 162 (e.g., optical splitter 137), as shown in FIG. 7. Intensity or frequency of cavity output light 125 communicated from optical microcavity 118 is measured to determine motion of the mechanical resonator 104. The intensity or frequency of initial laser light 124 can be changed to enhance detection of cavity output light 125, including simultaneous use of multiple wavelengths.

In an embodiment, with reference to FIG. 7, optomechanical ultrasound detector 100 can include laser source 161 that introduces light into the detection system. The laser source can produce light with variable frequency or at multiple wavelengths. Light routing element 162 sends laser light 124 to the ultrasound detector so that light re-emitted by the detector 125 can be analyzed. An analyzer 163 converts the light re-emitted by the detector into an electronic signal representing the representing the instantaneous ultrasound amplitude as measured by the motion of the detector element under the influence of the ultrasound waves. An ultrasound demodulation element 164 demodulates and analyzes the electronic signal from the analyzer to yield ultrasound measurements and images.

Measurement with the optomechanical ultrasound detector can be configured in various ways. In an embodiment, an ultrasound signal (an acoustic wave or pulse at ultrasonic frequencies) is produced by a source. The source may be separate from the detector 171 or integrated with it 155. In an embodiment, the signal interacts with an object under test that scatters it (including absorption, transmission, and reflection, possibly accompanied by changes in amplitude or frequency). In an embodiment, some of the scattered signal 103 impinges on the detector where it causes a mechanical element 104 to vibrate. In an embodiment, the vibration of mechanical resonator 104 changes the optical spectrum of the detector by changing the length of the cavity 118. Accordingly, optomechanical ultrasound detector 100 measures the change in the optical spectrum to track the motion of the mechanical element 104 and measure the ultrasound waves 103.

Optomechanical ultrasound detector 100 and processes disclosed herein have numerous beneficial uses. Advantageously, optomechanical ultrasound detector 100 is more sensitive than conventional detectors. For example, optomechanical ultrasound detector 100 can be approximately two orders of magnitude more sensitive than piezoelectric detectors and can detect very weak signals that are transmitted through a cranium for neuroimaging, which can be used in treatment of head trauma, e.g., in emergency medicine.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An optomechanical ultrasound detector for performing ultrasound imaging, the optomechanical ultrasound detector comprising:

a micromirror substrate;

a mechanical resonator disposed on the micromirror substrate, in optical communication with the micromirror substrate, spaced apart from the micromirror substrate at a cavity length $L_c$, and that:

receives ultrasound waves;

oscillates at an ultrasound frequency in response to receipt of the ultrasound waves;

changes the cavity length $L_c$ based on oscillation of the mechanical resonator at an ultrasound frequency;

receives initial laser light from the micromirror substrate; and produces intra-cavity light from the initial laser light; and an optical microcavity optically interposed between the micromirror substrate and the mechanical resonator and comprising the cavity length $L_c$ with cavity resonance frequency $f_c$ formed by optically opposing surfaces of the mechanical resonator and the micromirror substrate and that:

when the intra-cavity light is resonant with the cavity resonance frequency $f_c$, repeatedly communicates the intra-cavity light between the micromirror substrate and the mechanical resonator across the cavity length $L_c$, and when the intra-cavity light is non-resonant with the cavity resonance frequency $f_c$, communicates the intra-cavity light from the mechanical resonator to the micromirror substrate, such that the micromirror substrate produces cavity output light from the intra-cavity light, wherein the cavity output light optically encodes information about the ultrasound waves received by the mechanical resonator.

2. The optomechanical ultrasound detector of claim 1, further comprising a resonator substrate disposed on the micromirror substrate and on which the mechanical resonator is disposed.

3. The optomechanical ultrasound detector of claim 1, further comprising an anti-reflective member disposed on an ultrasound surface of the mechanical resonator and that receives the ultrasound waves.

4. The optomechanical ultrasound detector of claim 1, further comprising a resonator optical reflector disposed on a reflector surface of the mechanical resonator and that receives the initial laser light from the micromirror substrate and reflects the initial laser light as the intra-cavity light.

5. The optomechanical ultrasound detector of claim 1, further comprising a mirror anti-reflective member disposed on an optical coupling surface of the micromirror substrate and that receives the initial laser light, communicates the initial laser light to the mechanical resonator via the optical microcavity, receives the intra-cavity light from the optical microcavity, and produces the cavity output light from the intra-cavity light.

6. The optomechanical ultrasound detector of claim 1, further comprising a concave micromirror disposed on an optical coupling surface of the micromirror substrate, such that the concave micromirror is arranged to be optically concave with respect to the optical microcavity.

7. The optomechanical ultrasound detector of claim 6, further comprising a mirror reflective member disposed on a cavity surface of the micromirror substrate and that receives the initial laser light from the micromirror substrate and is an intra-cavity mirror for the optical microcavity, such that the mirror reflective member:

reflects the intra-cavity light when the intra-cavity light is resonant with the cavity resonance frequency $f_c$; and communicates the intra-cavity light to the micromirror substrate when the intra-cavity light is non-resonant with the cavity resonance frequency $f_c$.

8. The optomechanical ultrasound detector of claim 1, further comprising an optical fiber in optical communication with the micromirror substrate and that communicates the initial laser light to the micromirror substrate and receives the cavity output light from the micromirror substrate.

9. The optomechanical ultrasound detector of claim 1, further comprising a coupling lens in optical communication with the micromirror substrate and that receives the initial laser light, communicates the initial laser light to the micromirror substrate, and receives the cavity output light from the micromirror substrate, wherein the micromirror substrate is interposed between coupling lens and the optical microcavity.

10. The optomechanical ultrasound detector of claim 9, wherein the coupling lens is disposed on the micromirror substrate.

11. The optomechanical ultrasound detector of claim 10, further comprising a mirror anti-reflective member disposed on the coupling lens, wherein the coupling lens is interposed between the mirror anti-reflective member disposed and the micromirror substrate.

12. The optomechanical ultrasound detector of claim 1, further comprising a nanophotonic waveguide in optical communication with the micromirror substrate and that receives the initial laser light, communicates the initial laser light to the micromirror substrate, and receives the cavity output light from the micromirror substrate, wherein the micromirror substrate is interposed between nanophotonic waveguide and the optical microcavity.

13. The optomechanical ultrasound detector of claim 12, wherein the nanophotonic waveguide comprises a nanophotonic coupling member in optical communication with the micromirror substrate and that receives the initial laser light, communicates the initial laser light to the micromirror substrate, and receives the cavity output light from the micromirror substrate, wherein the micromirror substrate is interposed between nanophotonic coupling member and the optical microcavity.

14. The optomechanical ultrasound detector of claim 13, further comprising a nanophotonic substrate on which the nanophotonic waveguide is disposed.

15. The optomechanical ultrasound detector of claim 14, further comprising a dielectric layer disposed on the nanophotonic substrate such that the dielectric layer is interposed between the nanophotonic substrate and the nanophotonic waveguide.

16. The optomechanical ultrasound detector of claim 1, further comprising a meta-optic disposed on the micromirror substrate in optical communication with the micromirror substrate and that receives the initial laser light, communicates the initial laser light to the micromirror substrate, and receives the cavity output light from the micromirror substrate, wherein the micromirror substrate is interposed between the meta-optic and the optical microcavity.

17. The optomechanical ultrasound detector of claim 1, further comprising a piezoelectric ultrasound source disposed on a resonator substrate on which the mechanical resonator is disposed and that produces a probe ultrasound wave that is communicated from the optomechanical ultrasound detector to an object, such that the objects reflects the probe ultrasound wave as the ultrasound waves received by the mechanical resonator.

18. The optomechanical ultrasound detector of claim 1, further comprising the mechanical resonator with resonator frequency $f_r$ that matches an ultrasound frequency to resonate in response to detection of ultrasound waves.

19. A process for performing ultrasound imaging with an optomechanical ultrasound detector, the process comprising:

receiving ultrasound waves by a mechanical resonator of an optomechanical ultrasound detector, the optomechanical ultrasound detector comprising:

a micromirror substrate;

a mechanical resonator disposed on the micromirror substrate, in optical communication with the micromirror substrate, spaced apart from the micromirror substrate at a cavity length $L_c$; and an optical microcavity optically interposed between the micromirror substrate and the mechanical resonator and comprising the cavity length $L_c$ with cavity resonance frequency $f_c$, formed by optically opposing surfaces of the mechanical resonator and the micromirror substrate;

oscillating the mechanical resonator at an ultrasound frequency in response to receiving the ultrasound waves;

changing the cavity length $L_c$, of the optical microcavity based on oscillation of the mechanical resonator at an ultrasound frequency;

communicating initial laser light from the micromirror substrate to the mechanical resonator;

receiving, by the mechanical resonator, initial laser light from the micromirror substrate;

producing, by the mechanical resonator, intra-cavity light from the initial laser light;

optically encoding, by the mechanical resonator, in the cavity output light information about the ultrasound waves received by the mechanical resonator;

repeatedly communicating the intra-cavity light between the micromirror substrate and the mechanical resonator across the cavity length $L_c$ when the intra-cavity light is resonant with the cavity resonance frequency $f_c$;

communicating the intra-cavity light from the mechanical resonator to the micromirror substrate; and producing, by the micromirror substrate, cavity output light from the intra-cavity light to perform ultrasound imaging.

20. The process for performing ultrasound imaging of claim 19, further comprising communicating the cavity output light from the micromirror substrate to an analyzer.

21. The process for performing ultrasound imaging of claim 20, further comprising, performing by the analyzer:

receiving the cavity output light;

analyzing the cavity output light; and determining the information about the ultrasound waves from analyzing the cavity output light.

\* \* \* \* \*